July 24, 1928.

L. A. DURGIN

MEASURING AND RECORDING MACHINE

Filed June 29, 1925      2 Sheets-Sheet 1

Inventor
Leon A. Durgin
by Wright, Brown, Quinby & May
attys

July 24, 1928.
L. A. DURGIN
1,678,181
MEASURING AND RECORDING MACHINE
Filed June 29, 1925  2 Sheets-Sheet 2
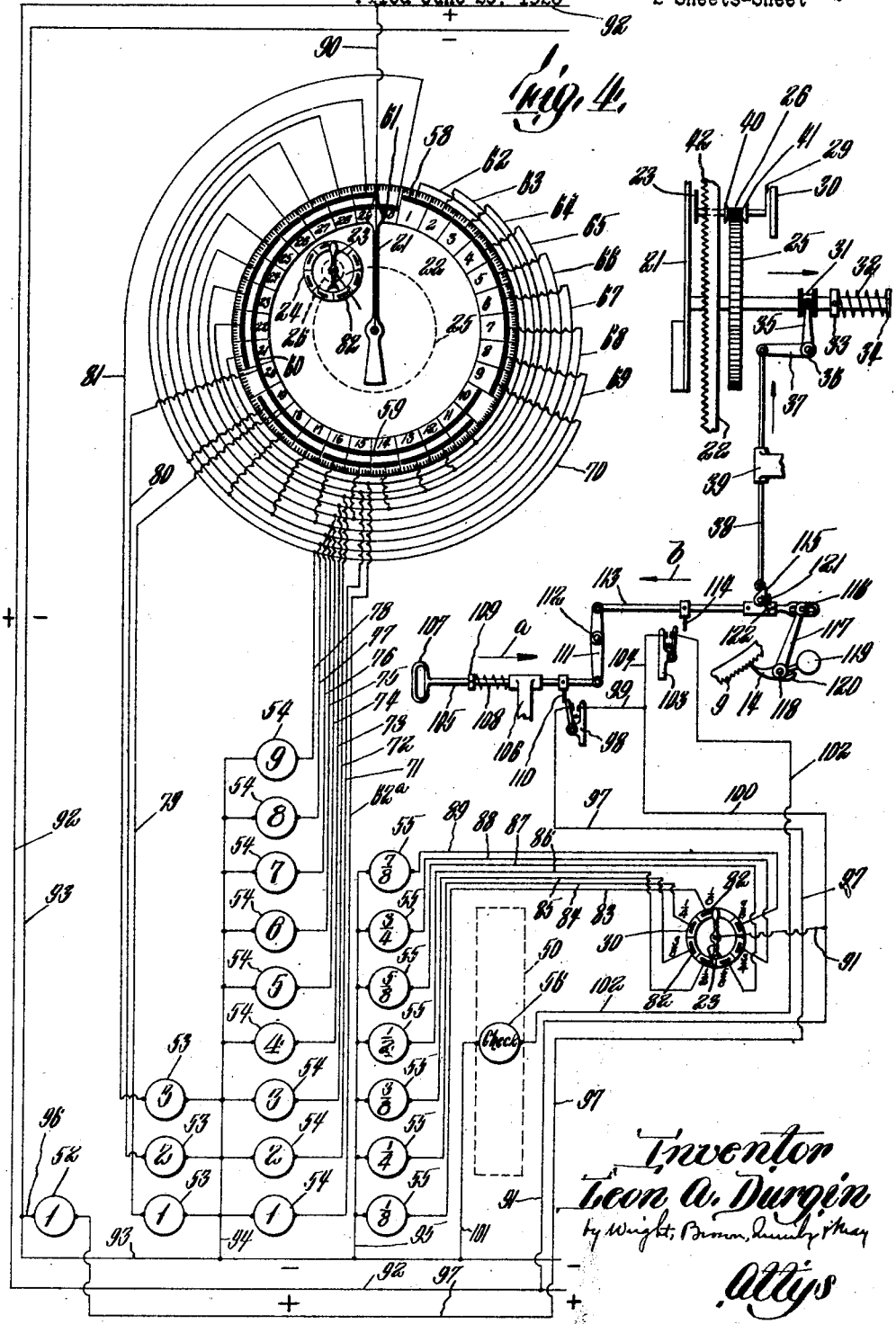

Patented July 24, 1928.

1,678,181

UNITED STATES PATENT OFFICE.

LEON A. DURGIN, OF DANVERS, MASSACHUSETTS.

MEASURING AND RECORDING MACHINE.

Application filed June 29, 1925. Serial No. 40,173.

The object of this invention is to provide means for measuring and automatically recording the values of measurements, and for adding together the values of a series of measurements. I have applied the invention to the specific purpose of recording and adding the areas of skins and other pieces of leather, and in the following specification an apparatus organized for this particular purpose is described. The leather measuring machine shown in the particular apparatus here referred to is one of the type in which the rotational movements of a number of wheels, arranged side by side, are integrated in terms of area by a single dial and pointer, or by a units dial and pointer combined with a fractional dial and pointer. The recording element of the combination is essentially an adding machine, which may be any one of several types of such machine on the market and in common use; and the values obtained by the measuring machine are transmitted to the adding machine by electrical agencies.

Essentially the same results of measuring, indicating, and recording, may be obtained for other values and in other terms than the surface areas of leather pieces and skins, by means embodying the same invention. Therefore, although one aspect of my invention consists in the combination of a leather measuring machine with an adding or recording machine and transmission means, as above indicated, the invention also includes all equivalent combinations adapted to accomplish results analogous in principle, although different in specific character and result.

I will explain the principles of the invention in connection with its specific application to the measurement of leather.

In the drawings:

Fig. 4 is a diagram showing the complete system of electrical transmission means between the measuring apparatus and the adding or recording apparatus.

Like reference characters designate the same parts wherever they occur in all the figures.

Figure 1:
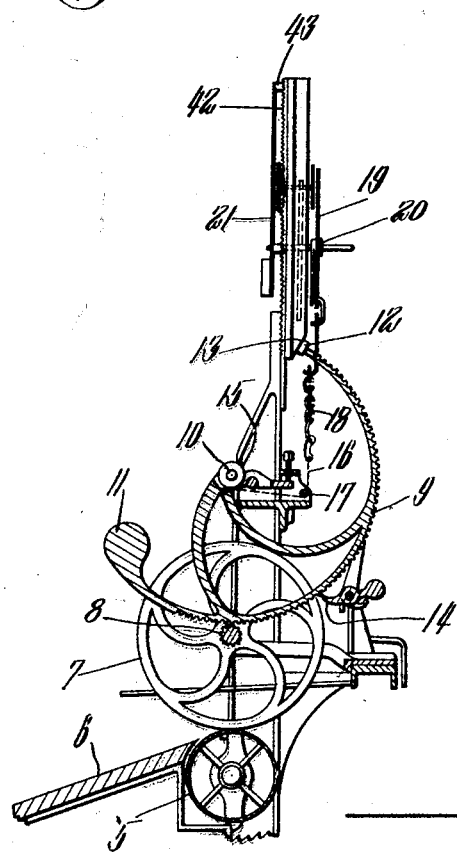
Figure 1 is a longitudinal vertical section of a leather measuring machine of a type which is now on the market and in general use.
Figure 2:
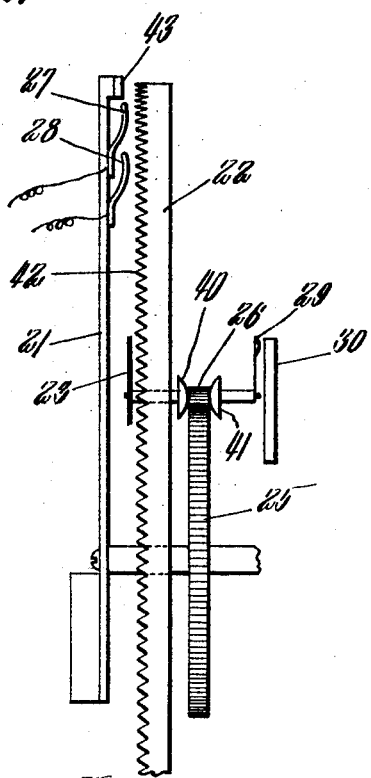
Fig. 2 is a detail view of the dials and pointers of the measuring machine, together with the electrical contacts associated with them.

The measuring instrument comprises a suitable frame on which there is arranged a continuously rotating roll 5 and a feed table 6 on which skins and leather pieces to be measured may be placed. Arranged above and in contact with the roll 5 are measuring wheels 7. A large number of such wheels are arranged side by side in parallel and with their centers on approximately the same axis, parallel to the axis of roll 5. Each of these wheels is designed to make contact with a narrow piece or zone of the strip being measured. The extent of rotation of each wheel is a measure of the lengths of the strips or zones of the piece with which the several wheels respectively make contact; and the number of wheels which are engaged by a piece of leather in its passage through the machine is the measure of the width of the piece. With each measuring wheel is connected a pinion 8 adapted to mesh with a large gear segment 9. The pinion is normally out of mesh with the gear segment, but when a leather piece enters between the roll 5 and the wheel, it raises the wheel and causes its pinion to engage the teeth of the segment. The segment turns about an axis at 10 and is weighted by a weight 11, so that its extremity 12 normally bears against a stop 13, and is returned to that position after the pinion has dropped out of mesh with the segment, and when a holding pawl 14 has been released. A drum 15 is connected to the segment gear and about the drum is wound a chain or equivalent tension element 16 which passes around a guide roll 17 and is connected to a lever system 18 by which the displacements of all the chains 16, effected by the segments 9, are reduced and collected into the movement of a single rack bar 19 which meshes with a pinion 20 on a staff connected to a pointer 21 arranged to travel over a dial 22.

The leather measuring machine above described is not original with me, but is a standard machine already in use, and is claimed herein only as an element, old in itself, of a combination which as a whole is new.

For a further description of this machine reference may be had to No. 153 of the Technologic papers of the Bureau of Standards, entitled "Area measurement of leather," issued April 24, 1920. It is sufficient for present purposes to explain that the transmission wheels 7, and associated transmission elements of the machine transmit to the pointer 21 movements which are proportional to the areas of the various pieces passing between the drum 5 and wheels 7.

In addition to the pointer 21, I have provided a secondary pointer 23 cooperating with a fractions dial 24 on the face of the main dial 22. This secondary or fractions pointer is geared to the shaft of the primary or units pointer 21 by means of a large gear 25 on said shaft, and a pinion 26 on the shaft of the fractions pointer.

Machines provided for measuring leather are usually calibrated to read in terms of square feet from one to thirty, and in Fig. 4 I have shown the main dial as divided accordingly. The fractions pointer and dial are here designed to measure eighths of the unit, and for that purpose the value of the gear ratio between the gears 25 and 26 will be such as to cause the pointer 23 to make one full rotation when the pointer 21 is moving through the angle between corresponding points in any two contiguous units divisions of dial 22. In this case therefore the gear ratio is thirty to one. It is to be understood of course that other specific values for the units indicated and other ratios between the movement of the main indicator and the fractions indicator may be arranged in the case of different machines embodying this invention but provided to show specifically different results.

Both dials and their respective pointers, are provided with complemental electrical contact members or devices, which are normally out of contact with each other but are adapted to be brought into contact when an indication has been made. In the illustration here given, the dial contacts consist of pieces of conducting material, later described in detail, set into or mounted upon the dials and insulated, while the complemental contacts associated with the pointers consist of brushes 27 and 28 on the pointer 21 and a brush 29 carried by the arbor of the fractions pointer 23. Preferably the contacts with which the fractions indicator brush 29 coacts, are mounted on a separate disk or holder 30, although if desired they may be mounted in the dial itself as in the case of the main dial, and a brush similar to the brushes 27 and 28 may be mounted directly on the fractions pointer. The diagrammatic Figure 4 shows the fractions contacts as set in the fractions dial, but it will be understood that when such contacts are mounted on a separate disk or holder, as above described, they will have substantially the arrangement as shown in said Fig. 4.

The shafts of the pointers are axially movable in order to bring their brushes into contact with the dial contacts. A suitable means for thus mounting and moving the pointers is shown diagrammatically in Figure 4. Here a collar 31 having two flanges is secured to the main pointer shaft, and a spring 32 is confined between a second collar 33 on this shaft and an abutment 34 which is a rigid part of the machine frame. A lever arm 35, having a fork at one end engaged with the collar 31, is pivoted at 36 and is connected with an arm 37, to the outer end of which a rod 38 is connected. This rod is positioned by a guide 39 through which it is movable. Spring 32 normally holds the pointers separated from the dial, when the rod 38 is raised, the pointers are moved toward the dial. Movements thus given to the main pointer shaft are transmitted to the fractions pointer shaft through the gear 25, which is confined between collars 40 and 41 flanking the pinion 26.

The mechanism by which movement is given to the rod 38 simultaneously with other operations, is later described.

Projecting from the face of the dial 22, preferably at its rim, is a series of V-shaped teeth and notches 42, with which cooperates a complemental tooth 43 on the pointer 21. The number of these notches is, preferably, equal to the number of fractions to be recorded, and their function in conjunction with the tooth 43, is to locate the two pointers exactly in the fraction-indicating position nearest to which the pointers are located when a record is made. As the teeth 42 and 43 come to an edge on their outer extremities, the tooth 43 will be certain to enter a notch and guide the pointers into contact-making position, even though they should not be exactly in position for indicating an exact number of fractions when the record is to be made.

Figure 3:
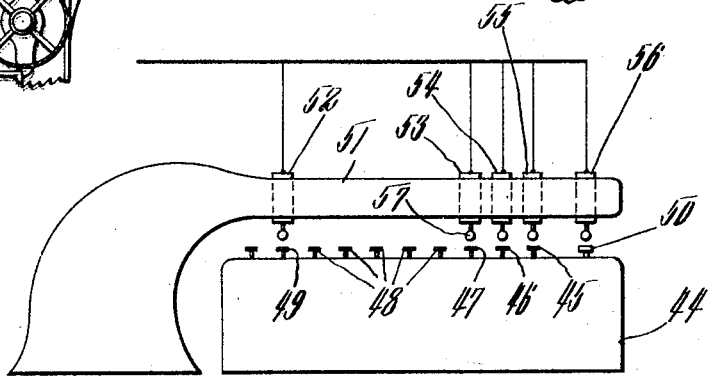
Fig. 3 is an elevation showing the adding machine or integrating member of the combination with the electrical devices for operating the same.

The instrument for recording and totalizing the values indicated by the measuring machine is shown at 44 in Fig. 3. This instrument may be any one of a number of well-known commercial adding machines having numeral indicators and keys for actuating the same, a printing attachment for printing on a tape the values indicated by depression of such keys, and means for adding and printing the totals of a number of successive values. Commercial machines of this character are put out having indicators numbered in terms of common fractions of desired values, as well as those in which the number are integers. Since such adding machines are well known it is unnecessary to illustrate the same in detail. Therefore I have merely shown the adding machine as viewed in elevation from its lower end, indicating also the number keys, which are ordinarily arranged in parallel rows, each row (except that of fractional values) consisting of nine keys of values from one to nine, and the fractional keys being any number and having the values appropriate to the fractional values which the machine is designed to record. Hence in Figure 3 the numeral 45 represents the end one of the row of fraction keys, 46 represents the corresponding key of the units row, and 47 the corresponding one of the tens row. Those numbered 48 represent keys of a commercial adding machine which are not used in this combination. They may be omitted from any machine which is especially designed and made for my combined apparatus. 49 is another key used to register the number of skins or pieces measured, or other operations of the apparatus. When an adding machine of standard type is used, this key may be the number 1 key in a row far enough removed from those used for recording the measurements taken to avoid danger of confusing its indications with the others. Finally 50 represents the so-called checking-in key or bar commonly provided with adding machines for causing the numbers registered by the machine to be printed on a tape or sheet of paper.

Over the adding or recording machine is arranged a frame or bridge 51 which carries electrically operated devices or members for actuating the keys of the adding machine. These devices are preferably solenoids 52, 53, 54, 55 and 56, the cores of which have foot pieces 57 adapted to depress the keys. Solenoid 52 with its core is arranged over the key 49, rows of solenoids 53, 54, and 55 are arranged over the keys in the rows 47, 46, and 45, respectively, and the solenoid 56 is arranged over the checking-in key 50.

The layout of the solenoids in case of an apparatus for measuring skins in terms of whole numbers and eighths of units up to thirty square feet is shown diagrammatically in Fig. 4. There are only three of the solenoids 53, and these are arranged over the No. 1, No. 2 and No. 3 keys of the tens column, since the limit of measurements here is thirty. But there is the full series of nine solenoids 54 arranged over their respective keys of the adding machine in the units column, and the full number of solenoids in conjunction with the fraction keys of the adding machine. It is to be understood of course that in case of an apparatus designed to give greater or otherwise different values, the number and disposition of the solenoids, or equivalent operating devices, will be modified and varied accordingly.

In the specific apparatus here diagrammatically shown, the units dial 22 is divided into thirty divisions, bearing units indicating numbers running consecutively from 1 to 30, and in each of these divisions except the tenth, twentieth and thirtieth, is a contact piece 58, all of which pieces are in the same circular arc beside the path in which the brush 27 travels. There are also a long contact piece 59 running from the tenth to the nineteenth division, a similar contact piece 60 running from the twentieth to the twenty-ninth division, and a short contact piece 61 in the thirtieth division, these contact pieces 59, 60, and 61 being in the same circular arc and beside the path of the brush 28. The contact pieces 58 in the first, eleventh, and twenty-first divisions, are all connected with an electrical conductor 62, which in turn is connected by a conductor $62^a$ with the No. 1 solenoid of the series numbered 54. Other conductors 63, 64, 65, 66, 67, 68, 69, and 70 are connected with the corresponding contact pieces 58 in the second, twelfth and twenty-second divisions; with those in the third, thirteenth and twenty-third divisions; and so on respectively. These same conductors are further connected by means of conductors 71, 72, 73, 74, 75, 76, 77, and 78 with the solenoids in the series 54 which respectively operate the keys numbered 2, 3, 4, 5, 6, 7, 8, and 9, respectively in the units column of the adding machine.

In like manner the long contact piece 59 is connected by a conductor 79 with the No. 1 solenoid of the series 53, the contact piece 60 is connected by the conductor 80 by the No. 2 solenoid of the same series, and the contact piece 61 is connected by conductor 81 with the number 3 solenoid of the same series.

The fractions dial, or rather, the contact-supporting plate 30, is provided with contact pieces 82 in a circular line conforming to the path of the brush which is connected to the fractions pointer. These several contacts are individually connected by means of conductors 83, 84, 85, 86, 87, 88, and 89 with the solenoids of the series 55 which operate the fractions keys of the adding machine.

In this diagram I have shown the pointers as connected by conductors 90 and 91 respectively with one of the leads or line wires 92 of a battery or power circuit, and the solenoids 53, 54, and 55 as connected with the other line wire 93, by the conductors 94 and 95, and suitable branch connection, in parallel.

The solenoid 52, which causes the number of measuring, or other, operations to be counted, is connected with the main line 93 by a conductor 96, and its opposite terminal is connected through a conductor 97 with one pole piece of a switch 98, the opposite pole piece of which is connected through the conductors 99, 100 and 91 with the line wire 92. The solenoid 56 which operates the checking-in key of the adding machine is connected by a conductor 101 with the line wire 93, and by a conductor 102 with one pole of a switch 103, the other pole of which is connected by a conductor 104 with the conductors 100 and 91 running to the line wire 92. Thus the solenoid 52 and switch 98 are connected in series between the line wires or main power leads; and the solenoid 56 and switch 103 are similarly connected in series between the leads of the power circuit.

All of the conductors may be gathered together into a cable of any desired length, whereby the adding machine and its operating devices may be located at any distance from the measuring machine and at any place desired. It is to be understood, of course, that the arrangement of wires and connections may be varied as desired to suit special conditions; those here shown being simply illustrative of a suitable operative layout.

The mechanism remaining to be described is that which controls the switches 98 and 103, the holding pawl 14, and the rod 38. It is preferably located near, and may be mounted directly upon the measuring machine, and supported in any desired way by the frame of said machine, or other suitable framing. In the drawing I have shown such mechanism in a diagrammatic manner only, since its practical embodiment may have many different forms which the machine designer is competent to lay out under the instructions given by this specification.

The said mechanism comprises a rod 105 guided in a sliding manner by a fixed support 106 and carrying a handle 107. This rod is normally held in the position shown in the drawing by a spring 108 confined between a part of the guide 106 and a collar 109 on the rod. The said rod carries a finger 110 in position to engage the movable arm of switch 98 and close the switch when the rod is moved in the direction of the arrow *a*. Rod 105 is connected to one arm of a rocker 111, which is pivoted at 112 and the other arm which is connected to a rod 113. Said rod 113 carries a finger 114 in position to engage and close the switch 103 when moved in the direction of the arrow *b*. It also carries a cam member 115 arranged to lift the rod 38, and it is connected by a lost motion pin and slot connection 116 with an arm 117 which operates means for disengaging all of the pawls 14 at one time. For this purpose the arm 117 may be connected to a shaft 118 on which all of the pawls 14 may be mounted loosely, that is with freedom to turn independently, so that they may be normally held against the segment gear 9 by their counter weights 119. The rod or shaft 118 may carry a finger 120 opposite each pawl and projecting under its weighted arm in such fashion that, when arm 117 is moved to the left, the finger will raise the said weighted arm and withdraw the pawl. The cam 115 is supported at one side by a stop 121, and is adapted to yield away from said stop against the resistance of a spring 122. Thereby it is enabled to raise the rod 38, under and in contact with the lower end of which it passes, when moved in the direction of arrow *b*, and to yield inoperatively when passing under the rod in the opposite direction.

In operating this apparatus to measure skins, the skins are fed one by one over the table of the measuring machine in the usual way. Those of the wheels 7 which are lifted by any part of the skin cause their respective segment gears 9 to be turned through angles proportional to the lengths of those zones of the skin which pass under the several wheels. Then by means of the transmitting mechanism 16, 18, 19 and 20, the pointer 21 is turned through an angle which is proportional to the sum of the movements of all the gear segments 9 thus moved. Each segment is retained by its pawl 14 in its position of greatest displacement, whereby the pointer remains in its indicating position after the skin has passed through the machine. Then the operator, in order to register and record the operation and its results, and also to restore the measuring machine into the condition for measuring another skin, grasps the handle 107 and pushes the rod 105 in the direction of the arrow *a*. The first effect of this action is to raise the rod 38 and displace the pointers bodily backward toward their dials, whereby the brushes carried by the pointers are brought into contact with the dial contacts nearest to the positions then occupied by the pointers. Thereupon current flows through those solenoids of the series 53, 54 and 55, whose circuits are at that time closed by the brushes 27, 28 and 29; and the corresponding keys of the adding machine are depressed to register the value of the measurement. At the same time, approximately, switch 98, which is normally held open by a spring shown in the drawing, is closed and current flows through solenoid 52, operating the key which records on the adding machine the number of the measuring operation. Soon afterwards, but not immediately because there is lost motion between the finger 114 and switch 103, the latter switch is closed and the solenoid 56 is caused to depress the checking-in key of the adding machine, whereby the values indicated are printed. Switch 103 also is normally held open by a spring, shown in the drawing. Finally the lost motion between rod 103 and arm 117 is taken up and the segment-holding pawls 14 are released, which leaves the weighted segments 9 free to return to their normal positions. When the operator releases the handle 107 the mechanism controlled thereby returns to its previous position, ready for the next measuring and recording operation.

The combined apparatus herein described makes it possible to record the measurements of individual skins and the sum of the areas of a lot of skins if desired; and to do so by accurate mechanical means, thus eliminating the possibility of error on the part of human agents in reading the indications of the measuring machine and in copying such indications on a memorandum. The adding machine element of the combination, moreover, may be located at any distance away from the measuring machine, as for instance in an office where records are kept, while the measuring machine may be in a warehouse or shop where skins are stored or used. It is to be remembered also that the same principles are applicable to any use involving a primary device wherein it is possible to provide a series of electrical contacts in cooperation with a relatively movable cooperating contact, whatever may be the specific character of such primary device or of the functions which it performs and the specific results obtained by its use.

For the purpose of generic definition of the claims, I include within the term "primary device" the measuring machine or equivalent apparatus, with its complemental electrical contacts, and by the term "recording apparatus," the adding machine or equivalent device capable of being operated to make a record, in accordance with the principles hereinbefore explained. The solenoids and their cores, hereinbefore described as means for impelling the operating keys of the adding machine, are electro-magnetic means for that purpose, for which other types of such means may be substituted; and they typify all electrically impelled motive devices capable of being applied to the same end by those skilled in the electrical arts.

What I claim and desire to secure by Letters Patent is:

1. The combination of a measuring machine having an indicating dial and pointer, an adding machine having keys, actuating electromagnets arranged in position to operate different ones of the keys of said adding machine, a series of electrical contacts insulated from one another and spaced according to the indications of the dial, said contacts being in parallel circuits with the several key actuating magnets, and a contact carried by the pointer complemental to said dial contacts and in series connection with said magnets and a source of electrical energy.

2. The combination of a measuring machine having a dial provided with electrical contacts and a pointer having a complemental contact and being movable into cooperating relation with the several contacts of the dial, an adding machine having operating keys, and electro-magnetic devices in actuating relationship to different keys of said adding machine and in electrical connection severally with said dial contacts and with a source of power, the pointer contact being also in electrical connection with the same source of power.

3. An indicating and recording apparatus comprising the combination of a dial, a pointer complemental to said dial, a recording machine having a plurality of record-effecting members, electro-magnetically operated impellers arranged in actuating relationship to said members, a series of contact pieces on the dial in direct parallel electrical connection with said electro-magnetic impellers, and a complemental contact carried by said pointer adapted to be brought into contact independently with different ones of said dial contacts.

4. A combined indicating and recording apparatus comprising a dial having electric contacts insulated and spaced apart from one another in a prescribed alinement, a pointer having a complemental contact adapted to be brought into contact individually with said dial contacts, an adding machine having operating keys, electro-magnetic devices having movable parts arranged respectively in position to operate different ones of said keys, the several electro-magnetic devices being directly connected with different ones of the dial contacts in the same electric circuit with said pointer contact, and means for bringing said pointer contact against a selected dial contact.

5. In an apparatus of the character set forth a dial having a series of evenly spaced unit indications, electrical contacts mounted in association with each of said unit indications except every tenth one, an extended parallel contact running continuously along said indications from the tenth to the nineteenth, and a pointer having complemental conducting means adapted to be placed in contact with the several unit contact pieces and with said extended contact piece.

6. In an apparatus of the character described a dial having electrical contacts, a pointer cooperating with said dial and having a complemental contact, means for moving said pointer over said dial to indicate value with respect thereto in a path wherein its contact is clear of the dial contacts, and other means for effecting a relative movement between the pointer and dial in a direction transverse to the first mentioned movement to bring the pointer contact and a selected one of the dial contacts together.

7. In an apparatus of the character set forth an adding machine having number keys and an additional control key, electromagnetic devices operatively arranged for actuating said keys, an indicating dial having electric contacts in circuit with the several electromagnetic devices which control said number keys, a movable pointer having a complemental contact normally clear of said dial contacts and in circuit with said electromagnetic devices and a source of current, means controlled by the operator for bringing the pointer contact and a selected dial contact together, a switch in the electrical circuit of that electro-magnetic device which operates said additional key, and means for closing said switch in sequence with said operator-controlled mechanism.

8. In an apparatus of the character described a dial and a cooperating pointer, complemental electric contacts carried by said dial and pointer normally separated from one another, a series of electro-magnetic devices in parallel circuits with the several dial contacts and in the same circuit with the pointer contact and a source of electricity, a separate electro-magnetic device in circuit with a source of electricity, a switch in the last named circuit, and mechanism controlled by the attendant of the machine for bringing said pointer contact against dial contact and for closing said switch.

9. In an apparatus of the character described a measuring machine including a dial having a series of units indications, a secondary dial having a series of indications representing fractions of the unit, pointers movably arranged to cooperate with each of said dials, said pointers being geared together to move at different speeds having a predetermined ratio, electrical contacts spaced in accordance with the divisions of the respective dials, and complemental contacts associated and movable with the pointers adapted to be brought into engagement with the respective dial contacts.

10. A measuring and recording apparatus comprising measuring devices, cooperating indicating means for showing the values obtained by said measuring devices, a series of insulated electrical contacts carried by one of said cooperating means, a complemental electrical contact carried by the other of said cooperating means and normally displaced from the first named contacts, an adding machine having a series of keys, a series of operating magnets associated with the respective keys of said adding machine and in parallel circuits with different ones of the before named series of contacts, the before named complemental contact being in series connection with all of said magnets and with a source of electrical energy, an additional key forming a part of said adding machine, an impelling electromagnet for said additional key, a switch in the circuit of said electromagnet, means for locking the said measuring devices in their measuring positions, and an associated operator controlled mechanism for moving the above named complemental contact into connection with the one of the series of contacts next to which it stops when in indicating position, for closing the switch of said additional key impelling magnet, and for releasing the locking means of said measuring devices.

In testimony whereof I have affixed my signature.

LEON A. DURGIN.